US009135394B2

(12) United States Patent
Joo

(10) Patent No.: US 9,135,394 B2
(45) Date of Patent: Sep. 15, 2015

(54) APPARATUS AND METHOD FOR DETECTING POWER

(75) Inventor: Choong Ki Joo, Seoul (KR)

(73) Assignee: LS INDUSTRIAL SYSTEMS CO., LTD., Anyang-Si, Gyeonggi-Do (KR)

( * ) Notice: Subject to any disclaimer, the term of this patent is extended or adjusted under 35 U.S.C. 154(b) by 162 days.

(21) Appl. No.: 13/014,950

(22) Filed: Jan. 27, 2011

(65) Prior Publication Data

US 2011/0218746 A1 Sep. 8, 2011

(30) Foreign Application Priority Data

Mar. 8, 2010 (KR) ........................ 10-2010-0020490

(51) Int. Cl.
*G01R 21/00* (2006.01)
*G06F 19/00* (2011.01)

(52) U.S. Cl.
CPC ...................................... *G06F 19/00* (2013.01)

(58) Field of Classification Search
CPC ....................................................... G06F 19/00
USPC ............................................................ 702/62
See application file for complete search history.

(56) References Cited

U.S. PATENT DOCUMENTS

| | | | | |
|---|---|---|---|---|
| 6,924,732 | B2 * | 8/2005 | Yokoo | 340/12.32 |
| 7,349,765 | B2 * | 3/2008 | Reaume et al. | 700/295 |
| 7,868,621 | B2 * | 1/2011 | Liu et al. | 324/512 |
| 2005/0007241 | A1 * | 1/2005 | Kline et al. | 340/310.01 |
| 2006/0038660 | A1 * | 2/2006 | Doumuki et al. | 340/310.11 |
| 2007/0236346 | A1 * | 10/2007 | Helal et al. | 340/539.22 |
| 2008/0190639 | A1 * | 8/2008 | Baran et al. | 174/50 |
| 2010/0134089 | A1 * | 6/2010 | Uram et al. | 324/66 |
| 2011/0191475 | A1 * | 8/2011 | Sudit | 709/226 |
| 2012/0223840 | A1 * | 9/2012 | Guymon et al. | 340/870.02 |

FOREIGN PATENT DOCUMENTS

| | | |
|---|---|---|
| CN | 2921839 | 7/2007 |
| CN | 101035218 | 9/2007 |
| JP | 10-282161 | 10/1998 |
| JP | 11-144177 | 5/1999 |

(Continued)

OTHER PUBLICATIONS

The State Intellectual Property Office of the People's Republic of China Application Serial No. 201110058189.6, Office Action dated Aug. 26, 2013, 9 pages.

*Primary Examiner* — Hyun Park

(74) *Attorney, Agent, or Firm* — Lee, Hong, Degerman, Kang & Waimey

(57) ABSTRACT

Disclosed herein is a power amount detection device respectively detecting power dissipated by each of various kinds of electric products and electronic gadgets of using commercial AC power, in which a plurality of outlet units confirms information of a load performing a communication with loads at the initial stage power is supplied through an outlet, integrates accumulating power amount used by a corresponding load, transmits electric amount and information of a corresponding load integrated at a unit time interval, and while inspecting entire power amount supplied to a plurality of outlet units, a server receives electric amount and information of a corresponding load transmitted by the plurality of outlet units to integratingly store electric amount for each load, and based on a signal of a key input part a server selects a load, and displays power amount of a selected load on a display part.

6 Claims, 4 Drawing Sheets

(56) References Cited

FOREIGN PATENT DOCUMENTS

| | | |
|---|---|---|
| JP | 2001-264369 | 9/2001 |
| JP | 2002-139526 | 5/2002 |
| JP | 2002-189779 | 7/2002 |
| JP | 2002-233082 | 8/2002 |
| JP | 3132953 | 6/2007 |
| JP | 2009-100282 | 5/2009 |

* cited by examiner

APPARATUS AND METHOD FOR DETECTING POWER

CROSS-REFERENCE TO RELATED APPLICATIONS

Pursuant to 35 U.S.C. §119(a), this application claims the benefit of earlier filing date and right of priority to Korean Application No. 10-2010-0020490, filed on Mar. 8, 2010, the contents of which are hereby incorporated by reference herein in their entirety.

BACKGROUND OF THE INVENTION

1. Field of the Invention

The present invention relates to an apparatus and method for detecting power amount. More particularly, the present disclosure relates to a power amount detecting device and a method of separately detecting each power consumed by several kinds of electric appliances and electric products using commercial AC power.

2. Description of the Related Art

Home or offices are furnished with a number of electric appliances and electronic devices including electric heaters and television sets using commercial AC (alternating current) power.

Home or offices have an exposed or burial type electric outlet supplying commercial AC power. The electric appliances and electronic products have a plug, and insert the plug into the outlet, thus providing commercial AC power to such electric appliances and electronic products.

On the other hand, the commercial AC power needs to be paid for rate based on use. To this end, each home or office has a wattmeter, which calculates power used at homes or offices.

Recently, the wattmeter is provided with a PLC (Power Line Communication) function. A wattmeter having the PLC communication function transmits used power to a server while conducting a PLC communication with an external server, and the server can remotely inspect power consumption inspected at each wattmeter.

However, the wattmeter only calculates an entire power used by electric appliances and electronic products at homes or offices, but power consumption used by respective electric appliances and electronic products cannot be integrated.

SUMMARY OF THE INVENTION

Accordingly, technical challenges sought by the present invention provide a power amount detecting device and method capable of separately integrating each of power amounts used by electric appliances and electronic products at home or offices.

Also, the present invention provides a power amount detection device and method of comparing an added electric power pulsing power amount used by each of electric appliances and electronic products to overall integrated electric power adding power amount used by entire electric appliances and electronic products and determining occurrence of an electric leakage, and producing an alarm in a case an electric leakage occurrence is determined.

Challenges solved by the present invention are not limited to the above-mentioned technical subjects, but a clearly understanding will be provided to those skilled in the art from the following recitation.

A power amount detecting device of the present invention is characterized by: a plurality of outlet units respectively installed at an outlet, acquiring information of a load communicating with the load when power is provided to the load through the outlet, and inspecting power amount used by a corresponding load and transmitting the inspected power amount with the information of load; and a server integrating and inspecting and displaying entire power amount supplied to a plurality number of loads through the plurality of outlet units, and building-up a database based on information of loads transmitted by each of the plurality of outlet units and integrating power amount of a corresponding load, and displaying power amount of each of integrated loads.

Each of the plurality of outlet units is characterized by: a power-amount detection part detecting power amount supplied to the load through the outlet, a sub control part determining if power is supplied to the load through the outlet using an output signal of the power amount detection part, acquiring information of a load communicating with the load in a case power is supplied to the load, accumulating power amount detected by the power amount detection part, and transmitting accumulated power amount and the information of load to the server, and a communication part performing communication with the load and the server under the control of the sub control unit.

In addition, a power amount detection device of the present invention is characterized by further including a memory storing an operating program and a task data of the sub control unit as well as integratingly storing power amount detected by the power amount detection part under the control of the sub control part.

A communication unit of the plurality of outlet units is characterized by a PLC (Power Line Communication) part performing communication via the power line.

Each of the plurality of outlet units further includes a filter blocking data communicating with the load from being transmitted to other outlet units and the server in a case of communicating with the load.

Specifically, the server is characterized by a power amount detection part detecting an entire power amount supplied to the plurality of outlet units through a power line, a communication part receiving information of a load and a power amount transmitted by the plurality of outlet units, a main control part controlling to detect and display an entire inspected power amount by integrating an entire power amount having detected by the power amount detection part as well as integratingly storing a use power amount of a corresponding load for each type of load received by the communication part, and controlling a display of integratingly stored load-specified power amount, and a display unit displaying the entire inspected power amount and the load-specified power amount along with the control of the main control part.

A communication part of the server is characterized by a PLC (Power Line Communication) part performing communication via the power line.

In addition, a power amount detecting device of the present invention is characterized by further including a key input part for commanding the main control part to select a load and display power amount of a corresponding load.

Also, a power amount detection device of the present invention further includes an alarm part that triggers an alarm upon an occurrence of electric leakage, and a feature the main control part compares a grossed power amount entirely pulsing an integrated and stored load-specified power amount with an overall inspected power amount, determines occurrence of an electric leakage as a comparison result if the overall inspected power amount is larger than the grossed power amount by more than a set value, and controls such that the alarm part produce an alarm.

In addition, a power amount detecting device of the present invention further includes a memory for storing the entire inspection power amount and load-specified power amount under the control of the main control part, and the main control part characteristically builds a database in the memory for each load, and dividing and storing power amount of a corresponding load at a time basis and a data basis in the built database.

Specifically, a power amount detection method of the present invention is characterized by confirming information of loads communicating with the load by a sub control part in case power is supplied to loads through an outlet, accumulating power amount supplied to the load, and transmitting information of the load and the accumulated power amount to a server at a preset unit time interval.

A communication of the sub control part and the load is characterized by a PLC (Power Line Communication).

Specifically, a transmission of information of the load and the accumulated power amount is performed in a PLC (Power Line Communication).

In addition, a power amount detection method of the present invention is characterized by integrating overall inspected power amount by inputting a detection signal of a power amount detection part by a control part, gathering data transmitted from a plurality of outlet units by the control part and extracting information of load and power amount, and dividing and integrating the extracted power amount based on extracted information of load, calculating a gross power amount pulsing power amount integrated by dividing the each one of load, and determining occurrence of an electric leakage with a difference value of a calculated gross power amount and the overall inspected power amount, and producing an alarm when occurrence of the electric leakage is determined.

Dividing and integrating the extracted power amount based on the extracted information of load is characterized in that the control part builds up a database for each load and divides and integrates the extracted power amount.

Also, a power amount detection method of the invention further includes selecting one of the plural loads by the control part based on a key signal of a key input part, and displaying accumulated integration power amount of a selected load on a display part.

BRIEF DESCRIPTION OF THE DRAWINGS

Hereinafter, the present invention will be described more specifically through embodiments unstuck to the present invention, referred to the accompanying drawings, in which same components in a part of the drawings are designated as same signs.

DETAILED DESCRIPTION OF THE INVENTION

The following detailed description is by way of example, only laying out embodiments of the invention. Also, the principle and concept of the invention are provided in a purpose of describing most usefully and easily.

Thus, an unnecessarily precise structure of a basic understanding of the present invention henceforth does not open up, and an example is provided through the drawings of various kinds of forms implemented from substance of the invention by a person skilled in the art.

Figure 1:
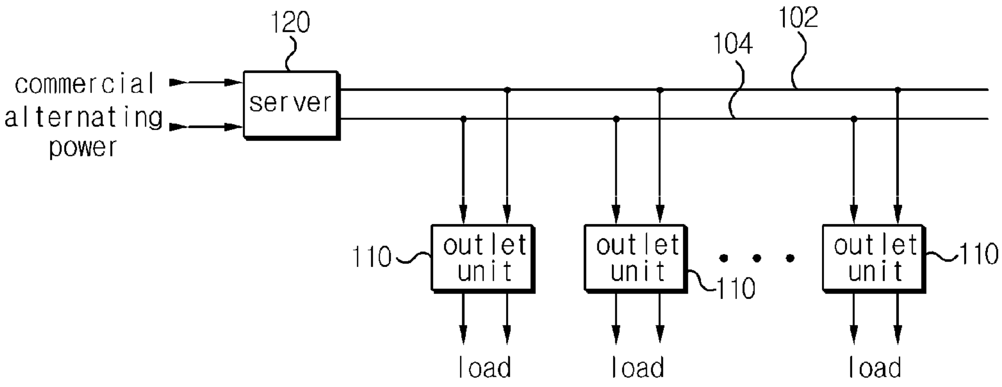
FIG. 1 is a diagram schematically showing an entire construction of a power amount detection device of the invention.

FIG. 1 is a diagram schematically showing an entire construction of a power amount detection device of the invention. Herein, reference numeral 102 and reference numeral 104 refer to power lines. The power lines 102, 104 are provided with commercial AC (Alternating Current) power.

Reference numeral 110 refers to a plurality of outlet units. In addition, each of the plurality number of outlet units 110 supplies power to loads such as electric appliances or electronic gadgets. Also each of a plurality of outlet units 110 performs a PLC (Power Line Communication) with the load power-supplied by itself to acquire information of a load. Also each of the a plurality of outlet units 110 inspects power amount supplied to a load in a unit time interval, and transmits an inspected power amount together with information of the load via a power line.

Reference numeral 120 refers to a server. The server 120 supplies commercial AC power inputted from outside to the plurality of outlet units 110 through the power lines 102, 104, and inspects entire power amount supplied to the plurality of outlet units 110. Also, the server 120 performs a PLC communication with each of the plurality of outlet units 110, thus acquires power amount each of the plurality of outlet units 110 supplies to a load, and integrates acquired power amount for each load. Also the server 120 adds power amount each of the plurality of outlet units 110 supplies to a load, determines electric leakage by comparing added gross power amount with the inspected entire inspection power amount, and produces an alarm in case occurrence of electric leakage is determined.

A power amount detection device of the invention having such a construction inspects an entire power amount, in a way that a server 120 inputs commercial AC power input from outside, outputting it to power lines 102, 104 and supplying it to a plurality of outlet units 110.

Each of outlet units 110 determines if the commercial AC power supplied through power lines 102, 104 is provided to a load. In a case the commercial AC power is supplied to a load through the outlet units 110, the outlet unit 110 checks information of a load performing a PLC communication with the load.

That is, in an initial stage commercial AC power is supplied to a load, each outlet units 110 performs a PLC communication with the load to request information of the load. In response to the request, information provided by the load is acquired by each outlet units 110, and information of a load power-supplied by itself is checked.

And, each outlet units 110 inspects power amount supplied into the load, and transmits the inspected power amount in a preset unit time interval together with information of the checked load to the server 120 by performing a PLC communication.

The server 120 accumulatively inspects an entire power amount supplied through the power lines 102, 104 and at the same time determines if a message containing power amount inspected by each of the plurality of outlet units 110 and information of a load is received.

If a message is received from outlet units 110, the server 120 extracts information of a load and power amount at a received message, and accumulates the power amount according to extracted information of a load.

And, the server 120 adds each accumulated entire power amount based on information of a load in a message received from outlet units 110 and calculates a gross power amount. When the gross power amount is calculated, the server 120 compares its own inspected entire inspection amount with the calculated gross power amount. In a case a difference value between entire inspection power amount and the gross power amount is more than a preset value, the server 120 determines occurrence of electric leakage and produce an alarm.

Also, the server 120 determines a display command of power amount is generated, and in a case a power amount display command is generated, the server 120 displays the used-power amount of the load selected according to an operation of a user.

Figure 2:
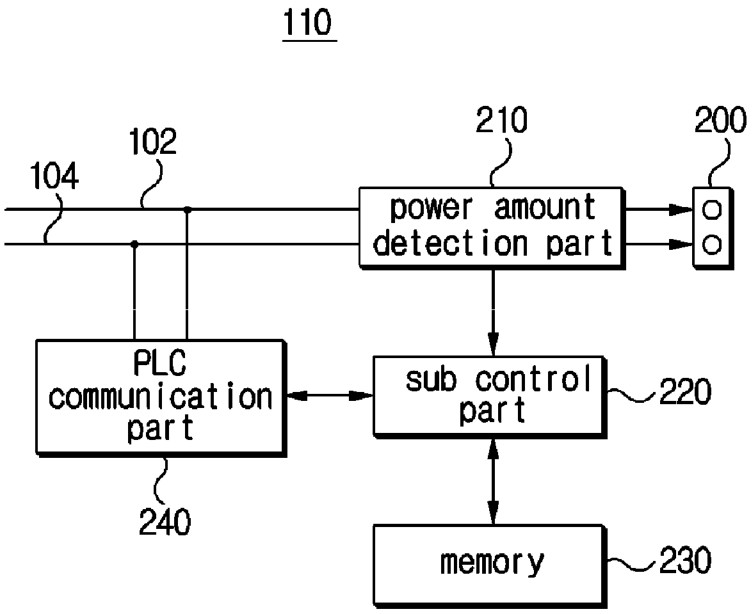
FIG. 2 is a diagram showing a construction of a preferred embodiment of each of a plurality of outlet units in a power amount detection device of the invention.

FIG. 2 is a diagram showing a construction of a preferred embodiment of each of a plurality of outlet units in a power amount detection device of the invention. Herein, Reference numeral 200 is an outlet. The outlet 200 is inserted with a plug (not shown in the drawing) equipped to a load, supplying commercial AC power provided through the power line 102, 104 to the load.

Reference numeral 210 is a power amount detection part. The power amount detection part 210 detects power amount supplied to a load through the outlet 200 at the power lines 102, 104.

Reference numeral 220 is a sub control part. The sub control part 220 determines if power is supplied into the load attached to a plug based on the output signal of the power amount detection part 210. If power is supplied into the load as the determination result, the sub control part 220 performs a PLC communication with the load to acquire information of a load. Also the sub control part 220 accumulates power amount detected by the power amount detection part 210, and transmits accumulated power amount and the information of a load in a unit time interval to the power lines 102, 104 by performing a PLC communication.

Reference numeral 230 is a memory. The memory 230 is pre-stored with an operational program of the sub control part 220. Also, a task data of the sub control part 220 is stored into the memory 230. Also, the memory 230 is accumulatively stored with power amount detected by the power amount detection part 210 under the control of the sub control part 220.

Reference numeral 240 is a PLC communication part. The PLC communication part performs a PLC communication that transmits and receives a predetermined data through the power lines 102, 104 under the control of the sub control part 220.

In a state commercial AC power is supplied to power lines 102, 104, if commercial AC power is provided to a load through an outlet 200, a power amount detection part 210 detects power amount supplied into a load and a signal of a detected power amount is input to the sub control part 220.

Then, the sub control part 220 determines, by using a detection signal of the power amount detection part 210, that electric power is provided to a load through an outlet 200 at the power lines 102, 104, and generates an information request message requesting information of a load using power. After the information request message is generated by the sub control part 220, the information request message is output to the power lines 102, 104 through a PLC communication part 240.

That is, the PLC communication part 240 outputs the information request message to the power lines 102, 104 by performing PLC communication.

Information request message output to the power lines 102, 104 is transmitted to the load through an outlet 200, the load transmits, by performing a PLC communication, pre-stored information of the load in itself according to the information request message through the outlet 200 to the power lines 102, 104.

That is, the load generally includes a PLC communication part performing PLC communication, a control part controlling an operation of the PLC communication part, and a memory storing information of a load, for example, information of a load including name of products, identification numbers and characteristic codes of products.

In case the information request message output from the PLC communication part 240 through the power lines 102, 104 is received, the control part of the load extracts information of a load from the memory and outputs extracted information of the load through the power lines 102, 104 by performing PLC communication.

Information of the load output to the power lines 102, 104 is received by a PLC communication part 240 and input to the sub control part 220. And the sub control part 220 may confirm the load using power supplied through an outlet 220.

At this time, there may occur an error misrecognizing a load connected to its own outlet 200, when an information request message output through the PLC communication part 240 to the power lines 102, 104 by the sub control part 220 is transmitted to another outlet connected load rather than a load connected to its own outlet 200 so that a corresponding load transmits its own load information, and a sub control part 220 inputs it through a PLC communication part 240.

Therefore, in practicing the invention, a front end of a part connecting the power lines 102, 104 and the PLC communication part 240 preferably has, for example, a filter normally passing power and blocking data received by the PLC communication part 240. And in a case a sub control part 220 controls the PLC communication part 240 to output an information request message to the power lines 102, 104, it is preferable that the sub control part 220 activates the filter so that the information request message is only transmitted to a load attached to its own outlet 200 by a plug.

When information of a load of which a plug is attached to the outlet 200 is determined, the sub control part 220 accumulatively integrates power amount detected by a power amount detection part 210, and outputs accumulated integrated power amount in a unit time interval along with information of a load via a PLC communication part 240 to power lines 102, 104 to transfer them to a server 120.

Figure 3:
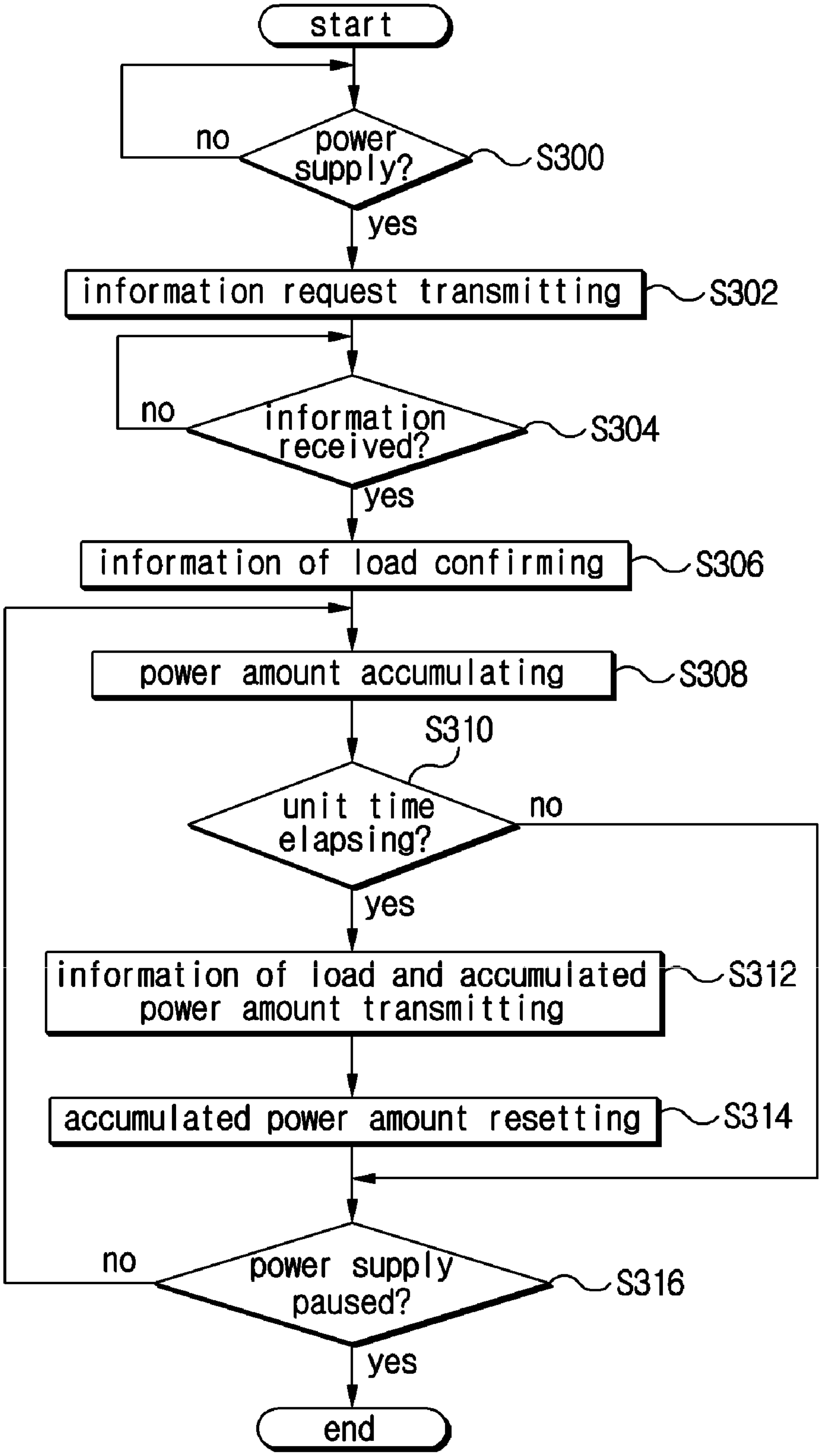
FIG. 3 is a signal flow diagram showing an action of a preferred embodiment of a power amount detection method of the invention.

FIG. 3 is a signal flow diagram showing an action of a preferred embodiment of each of a plurality of outlet units in a power amount detection method of the invention. Referring to FIG. 3, a sub control part 220 determines that a plug of a load is attached to an outlet 200 and power is supplied to the load (S300).

As the determination result, in a case electric power is supplied the load through the outlet 200, the sub control part 220 generates an information request message, and outputs the generated information request message to power lines 102, 104 through a PLC communication part 240 to transmit it to the load (S302).

And the sub control part 220 determines if information of a load is received from the load having a plug attached to an outlet 200 (S304).

When information of the load is received, the sub control part 220 confirms information of a load whose plug is attached to the outlet 200 (S306), and accumulatively integrates power amount detected by a power amount detection part 210 (S308).

Also, the sub control part 220 determines if a preset unit time elapses (S310). The sub control part 220 also outputs information of a load and accumulatively integrated power amounts to power lines 102, 104 through a PLC communication part 240 whenever the preset unit time elapses, transmits them to the server 120 (S312), and resets accumulated power amount (S314).

And the sub control part 220 determines, based on an output signal of a power amount detection part 210, if power is continuously supplied to the load which equips a plug connecting to the outlet 200 (S316). As the determination result, if it is determined that a power is continuously supplied to a load, the sub control part 220 reverts to the step S308 and repeatedly performs the operation that accumulatively integrates power amount output from the power amount detection part 210 and outputs accumulatively integrated power amount along with information of a load in a unit time interval to power lines 102, 104 through a PLC communication part 240 to transmit it to the server 120.

Also the sub control part 220 accumulates power amount in case a power supply pauses in the step 316, and ends an operation of transmitting to the server 120.

Figure 4:
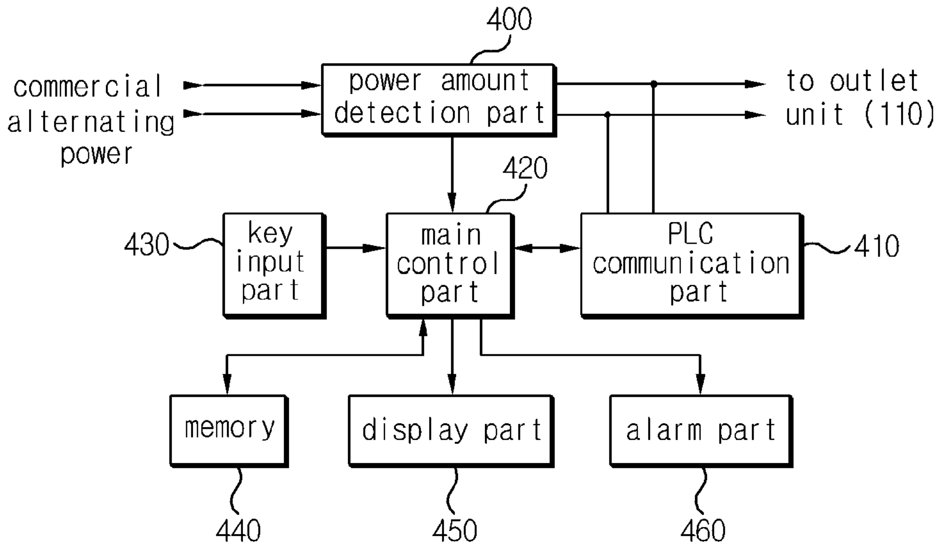
FIG. 4 is a diagram showing a construction of a preferred embodiment of a server in a power amount detection device of the invention.

FIG. 4 is a diagram showing a construction of a preferred embodiment of a server in a power amount detection device of the invention. Herein, reference numeral 400 is a power amount detection part. The power amount detection part 400 detects power amount supplied through power lines 102, 104.

Reference numeral 410 is a PLC communication part. The PLC communication part 410 performs a PLC communication transmitting and receiving a predetermined data through the power lines 102, 104.

Reference numeral 420 is a main control part. The main control part 420 accumulatively integrates entire power amount supplied through the power lines 102, 104 by using an output signal of the power amount detection part 400. Also the main control part 420 receives data transmitted by each of the plurality of outlet units 110 and accumulatively integrates used power amount for each load. Also the main control part 420 compares a difference value between an entire gross power amount pulsing power amount integrated for each load to entire inspection power amount inspected by an output signal of the power amount detection part 400, determines occurrence of electric leakage when a difference of gross power amount and entire inspection power amount is over a preset value, and controls producing an alarm.

Reference numeral 430 is a key input part. The key input part 430 has a plurality of functional keys, and a user generates a predetermined operation command and outputs it to the main control part 420 according to selective manipulation of a plurality of functional keys.

Reference numeral 440 is a memory. The memory 440 is pre-stored with an operation program of the main control part 420. In addition, the memory 440 is stored with entire inspection power amount integrating power detected by the power amount detection part 400 of the main control part 420. Also the memory 440 is built-up with a database for each load by the main control part 420, and the built database is stored with power amount used by a corresponding load such as divided with a date basis and a time basis.

Reference numeral 450 is a display part. The display part 450 displays entire inspection power amount and power amount integrated for respective load according to a control of the main control part 420, divided such as with a time zone basis and a data basis.

Reference numeral 460 is an alarm part. The alarm part 440 alarms off occurrence of electric leakage under a control of the main control part 420.

Power amount detection part 400 detects power amount used by loads and outputs the detected power amount to the main control part 420.

Then, the main control part 420 detects entire power amount used by loads respectively attached to an outlet 200 of a plurality of outlet units 110 by integrating power amount detected by a power amount detection part 400, and stores detected entire power amount in the memory 440 as well as displays the same on the display part 450 so that a user can confirm.

And the PLC communication part 410 receives data transmitted through power lines 102, 104 and inputs the received data into the main control part 420.

When the received data is input from the PLC communication part 410, the main control part 420 extracts information of a load and power amounts from the received data and builds a database of a load corresponding to the extracted information in the memory 440. And the main control part 420 stores power amount used by a corresponding load in the built-up database in a divided way such as time zone basis and date basis.

Also, the main control part 420 calculates a gross power amount by adding the entire power amounts used by each of the loads, stored in the database and compares the calculated gross power amount to entire inspection power amount inspected by using the output signal of the power amount detection part 210. And, the main control part 420 determines that there occurs an electric leakage if a difference value of gross power amount and entire inspection power amount is over a preset value as a comparison result and controls the alarm part 460 to produce an alarm.

In addition, the main control part 420 selects a load of which a power amount is detected based on a key signal input from the key input part 430 and displays power amount of the selected load on the display part 450 in a time zone basis or date basis so that a user can confirm it.

Figure 5:
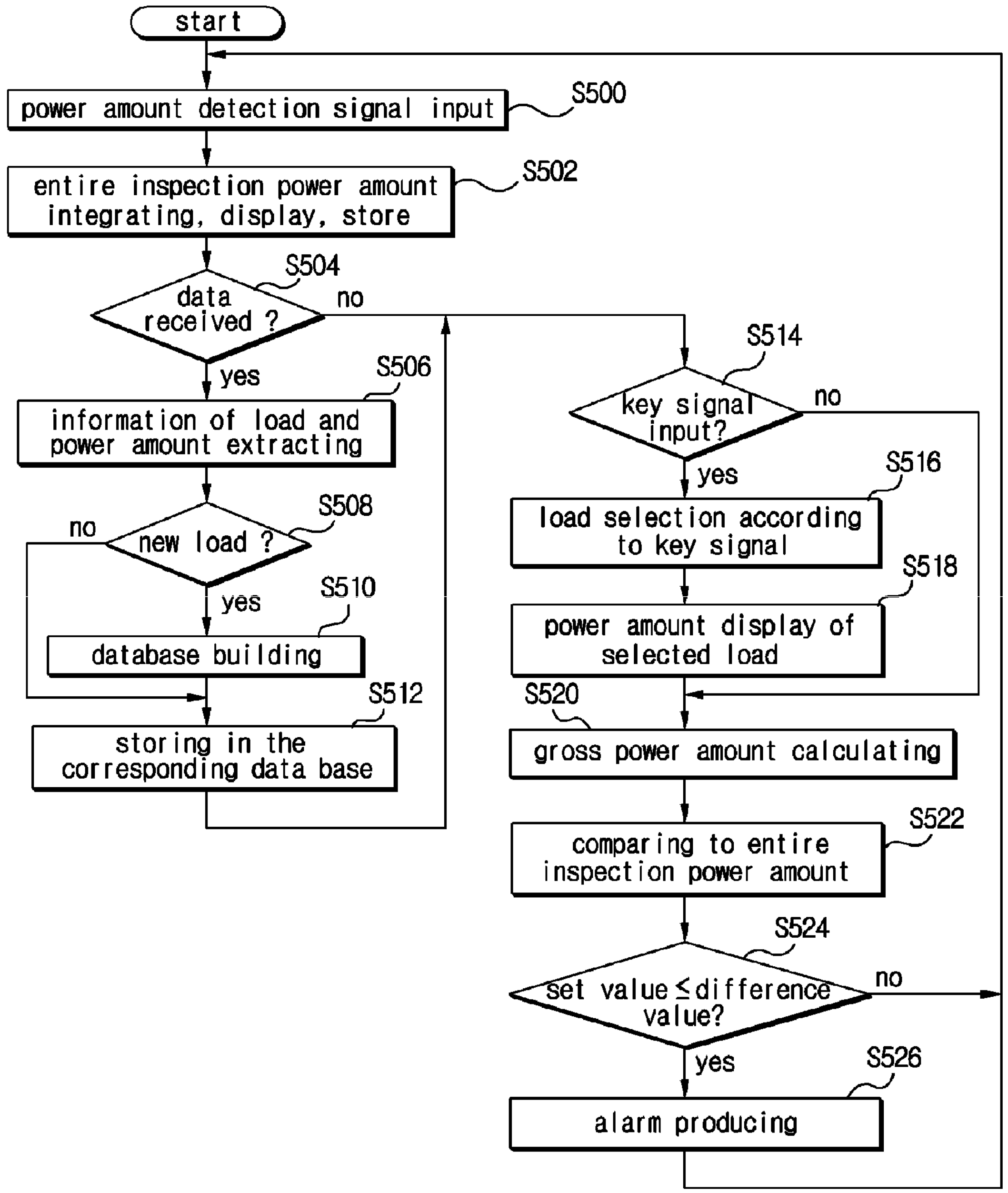
FIG. 5 is a signal flow diagram showing an action of a preferred embodiment of a server according to a power amount detection method of the invention.

FIG. 5 is a signal flow diagram showing an operation of each of the preferred embodiments of a server in power amount detection method of the present invention. Referring to FIG. 5, the main control part 420 inputs a power amount detection signal output from the power amount detection part 400 by detecting power amount (S500), accumulates and integrates the power amount of the input power amount detection signal to entire inspection power amount stored in the memory 440. And the main control part 420 also displays the accumulatively integrated entire inspection power amount on the display part 450 and stores it in the memory 440 in an updated way (S502).

And the main control part 420 determines if data output to power lines 102, 104 by a plurality of outlet units 110 is received and input by a PLC communication part 410 (S504).

From the determination result, in a case data is received, the main control part 420 extracts information of a load and power amount from the received data (S506) and determines if a load corresponding to the extracted information is a new load from which a database is not built in the memory 440 (S508).

In a case of a new load about which a database is not built in the memory 440 from the determination result, the main control part 420 builds up the database in the memory 440 (S510) and accumulatively integrates the power amount in a corresponding database of a load by dividing such as time basis and date basis (S512).

And the main control part 420 determines if a predetermined key signal from the key input part 430 is input (S514) and the main control part 420 respectively selects the loads which built the database when the key signal is input (S516).

And the main control part 420 extracts power amount used by a selected load from a database of a corresponding load stored in the memory 440 and displays it on the display part 450 so that a user can confirm (S518).

Also the main control part 420 calculates a gross power amount by adding power amounts of each of the loads stored in the memory 440 (S520) and calculates a difference value by comparing the calculated gross power amount to the entire inspection power-amount (S522). When the difference value is calculated, the main control part 420 determines if the computed difference value is over a preset value.

If the difference value is less than a preset value, the main control part 420 determines that electric leakage does not occur and thus reverts to the step 500. And the main control part 420 repeats the action of determining occurrence of electric leakage in which the main control part accumulatively integrates entire inspection power amount, accumulatively stores the used power of the respective load into the database by the hour or date, displays power amount of a corresponding load according to input of a key signal and determines if an electric leakage is occurred.

And if the difference value calculated in the step 524 is more than a preset value, the main control part 420 determines that an electric leakage has occurred and controls the alarm part 460 to alarm occurrence of electric leakage (S526) and reverts to the step 500.

A power amount detection device of the invention detects and displays power provided to each of loads through each outlet.

Therefore, users may confirm power amount used by each of the loads owned by users and may abstains from the waste of power consumption, thus possibly improves efficiency of power use.

According to the embodiments of this invention, occurrence of minute electric leakage is precisely detected and displayed, so that electric leakage incurred accident can be prevented in advance.

While the present invention has been described in detail through representative embodiments in the above part, those skilled in the art would understand that various modifications can be made in the described embodiment without departing from the scope of the present invention.

Therefore, the scope of the present invention rights should not be restricted to the described embodiment, but should be defined by the accompanying claims and its equivalents.

What is claimed is:

1. A system for detecting power usage, comprising:
- a plurality of outlets installed at a power line, each outlet of the plurality of outlets comprising:
  - a first detector configured to detect a load-side power amount supplied to a load via the outlet;
  - a first transmitter configured to communicate with the load and a server;
  - a filter configured to allow transmission of power in a non-activated state and limit a transmission of data to only the load in an activated state, the transmission transmitted by the first transmitter; and
  - a sub-controller configured to:
    - determine whether power is supplied to the load via the first detector;
    - cause the first transmitter to transmit a load information request to the load;
    - activate the filter when the load information request is transmitted;
    - receive load identification information from the load via the first transmitter; and
    - cause the first transmitter to transmit a message including the detected load-side power amount and the load identification information to the server when a preset unit of time elapses; and
- a server comprising:
  - a second detector configured to detect a server-side power amount supplied to each of the plurality of outlets through the power line;
  - a second transmitter configured to communicate with the plurality of outlets;
  - a display; and
  - a main controller configured to:
    - receive the transmitted message from each outlet of the plurality of outlets via the second transmitter;
    - cause a memory to store in a database the load-side power amount and the load identification information associated with each load from each outlet of the plurality of outlets;
    - cause the display to display the server-side power amount and the load-side power amount for each outlet;
    - determine an integrated server-side power amount using the server-side power amount for each of the plurality of outlets;
    - determine an integrated load-side power amount using the load-side power amount of each of the plurality of outlets;
    - cause the memory to store the integrated server-side power amount and the integrated load-side power amount;
    - compare the integrated server-side power amount and the integrated load-side power amount and cause an alert to be output when a difference of the comparison exceeds a threshold amount.

2. The system of claim 1, wherein each outlet of the plurality of outlets further comprises a memory configured to store:
- an operating program;
- task data of the sub-controller and
- the load-side power amount detected by the first detector.

3. The system of claim 1, wherein the first transmitter includes a PLC (Power Line Communication) unit configured to perform communication via the power line.

4. The system of claim 1, wherein the second transmitter includes a PLC (Power Line Communication) unit configured to perform communication via the power line.

5. The system of claim 1, wherein the server further comprises an input unit configured to receive user input for selecting a load to display the power amounts related to the selected load.

6. The system of claim 1, wherein the server further comprises an alarm unit configured to output the alert.

* * * * *